(12) United States Patent
Lin et al.

(10) Patent No.: US 8,618,984 B2
(45) Date of Patent: Dec. 31, 2013

(54) SELECTING BEACONS FOR LOCATION INFERENCE

(75) Inventors: Jyh-Han Lin, Mercer Island, WA (US); Lon-Chan Chu, Redmond, WA (US); Aravind Krishnamachari Seshadri, Redmond, WA (US); Prasanta Ghosal, Bellevue, WA (US); Christopher Russell Rice, Monroe, WA (US); Anup Kashinath Pachlag, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 323 days.

(21) Appl. No.: 12/727,901

(22) Filed: Mar. 19, 2010

(65) Prior Publication Data

US 2011/0227791 A1   Sep. 22, 2011

(51) Int. Cl.
*G01S 5/02*   (2010.01)
(52) U.S. Cl.
CPC ............ *G01S 5/0252* (2013.01); *G01S 5/0278* (2013.01)
USPC .......................................... 342/451; 342/464
(58) Field of Classification Search
USPC ............................ 342/386, 450, 451, 463, 464
See application file for complete search history.

(56) References Cited

U.S. PATENT DOCUMENTS

| | | | |
|---|---|---|---|
| 5,936,572 A * | 8/1999 | Loomis et al. ........... | 342/357.29 |
| 6,776,334 B1 | 8/2004 | Garg | |
| 7,397,424 B2 | 7/2008 | Houri | |
| 7,474,897 B2 * | 1/2009 | Morgan et al. .............. | 455/456.5 |
| 7,577,244 B2 | 8/2009 | Taschereau | |
| 7,750,848 B2 * | 7/2010 | Normark et al. .......... | 342/357.25 |
| 2004/0203904 A1 * | 10/2004 | Gwon et al. ................ | 455/456.1 |
| 2007/0001867 A1 * | 1/2007 | Rowe et al. .............. | 340/825.49 |
| 2007/0210961 A1 | 9/2007 | Romijn | |
| 2008/0176583 A1 * | 7/2008 | Brachet et al. .............. | 455/456.3 |
| 2008/0238767 A1 | 10/2008 | Zhou | |
| 2008/0252511 A1 | 10/2008 | Jacotot | |
| 2008/0280624 A1 | 11/2008 | Wrappe | |
| 2010/0013704 A1 * | 1/2010 | Coutel et al. ............. | 342/357.04 |

OTHER PUBLICATIONS

Olson et al, "Robust Range-Only Beacon Localization," IEEE AUV, 2004.*

(Continued)

*Primary Examiner* — Gregory C Issing

(57) ABSTRACT

Location inference using selected beacons. Data is received representing a set of beacons observed by a computing device. The beacons are located within a first geographic area. A subset (e.g., a clique) of the beacons is selected based on a coverage area of each of the beacons, where each of the beacons in the selected subset has a coverage area that overlaps with the coverage area of each of the other beacons in the selected subset. Using known or estimated positions of the beacons, a second geographic area is defined based on the selected subset of beacons and the beacon reference data and the coverage areas associated therewith. The second geographic area, smaller than the first geographic area, represents an approximate location of the computing device. In some embodiments, the computing device is calculated to be within the second geographic area with 95% probability.

20 Claims, 5 Drawing Sheets

(56) References Cited

OTHER PUBLICATIONS

Meneses, et al., "Enhancing the Location-Context through Inference over Positioning Data", Retrieved at<<http://ubicomp.algoritmi.uminho.pt/csmu/proc/meneses-135.pdf>>, Jun. 2006, pp. 10.

Sinha, et al., "A Beacon Selection Algorithm for Bounded Error Location Estimation in Ad Hoc Networks", Retrieved at <<http://ieeexplore.ieee.org/stamp/stamp.jsp?arnumber=4127348&isnumber=4127326>>, Mar. 5-7, 2007, pp. 6.

Lieckfeldt, et al., An Algorithm for Distributed Beacon Selection, Retrieved at<<http://ieeexplore.ieee.org/stamp/stamp.jsp?arnumber=4517414&isnumber=4517341>>, Sixth Annual IEEE International Conference on Pervasive Computing and Communications, Mar. 17-21, 2008, pp. 318-323.

Bahl, et al., "RADAR: An In-Building RF-based User Location and Tracking System", Retrieved at<<http://www.cs.indiana.edu/~connelly/Docs/radar.pdf>>, 2000, pp. 10.

* cited by examiner

SELECTING BEACONS FOR LOCATION INFERENCE

BACKGROUND

Some existing positioning systems such as global positioning systems (GPS) determine the location of devices using satellites. Other systems such as collaborative positioning systems determine the location of the devices based on crowd-sourced data. The crowd-sourced data typically includes a list of beacons observed at a particular location along with identification of the particular location as obtained by mobile devices such as laptops, netbooks, and cellular telephones. The positions of the beacons are then used to estimate the location of devices (e.g., those lacking GPS capability or coverage) that request position information based on an observed list of beacons. The complexity and accuracy of the estimations depend in part on which beacons are selected for the estimations.

SUMMARY

Embodiments of the disclosure enable the selection of beacons from which to infer a location of a computing device. A computing device observes a set of beacons within a first geographic area. Data representing the set of beacons is received from the computing device. A subset of the beacons is selected based on a coverage area of each of the beacons such that each of the beacons in the selected subset has a coverage area that overlaps with the coverage area of each of the other beacons in the selected subset. A second geographic area, smaller than the first geographic area, is defined based on the selected subset of beacons, beacon reference data, and the coverage areas to estimate the location of the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable selection of beacons from which to infer a location of a computing device. The beacons are selected based on their relationship to neighboring beacons. In some embodiments, the computing device detects a set of beacons $\{b_1, b_2, \ldots, b_N\}$. Knowing the estimated positions and coverage areas of each of the beacons, aspects of the disclosure determine the smallest circle such that the location of the computing device is within the circle with 95% probability. The calculated location of the computing device is provided to the computing device.

Referring again to FIG. 1, an exemplary block diagram illustrates the positioning system 106 inferring a location of a mobile device 102 based on a beacon fingerprint provided by the mobile device 102. The mobile device 102 (e.g., a mobile telephone) detects or observes one or more beacons including cellular towers (or sector if directional antennas are employed) and wireless fidelity (Wi-Fi) access points or other wireless access points (WAPs).

Figure 1:
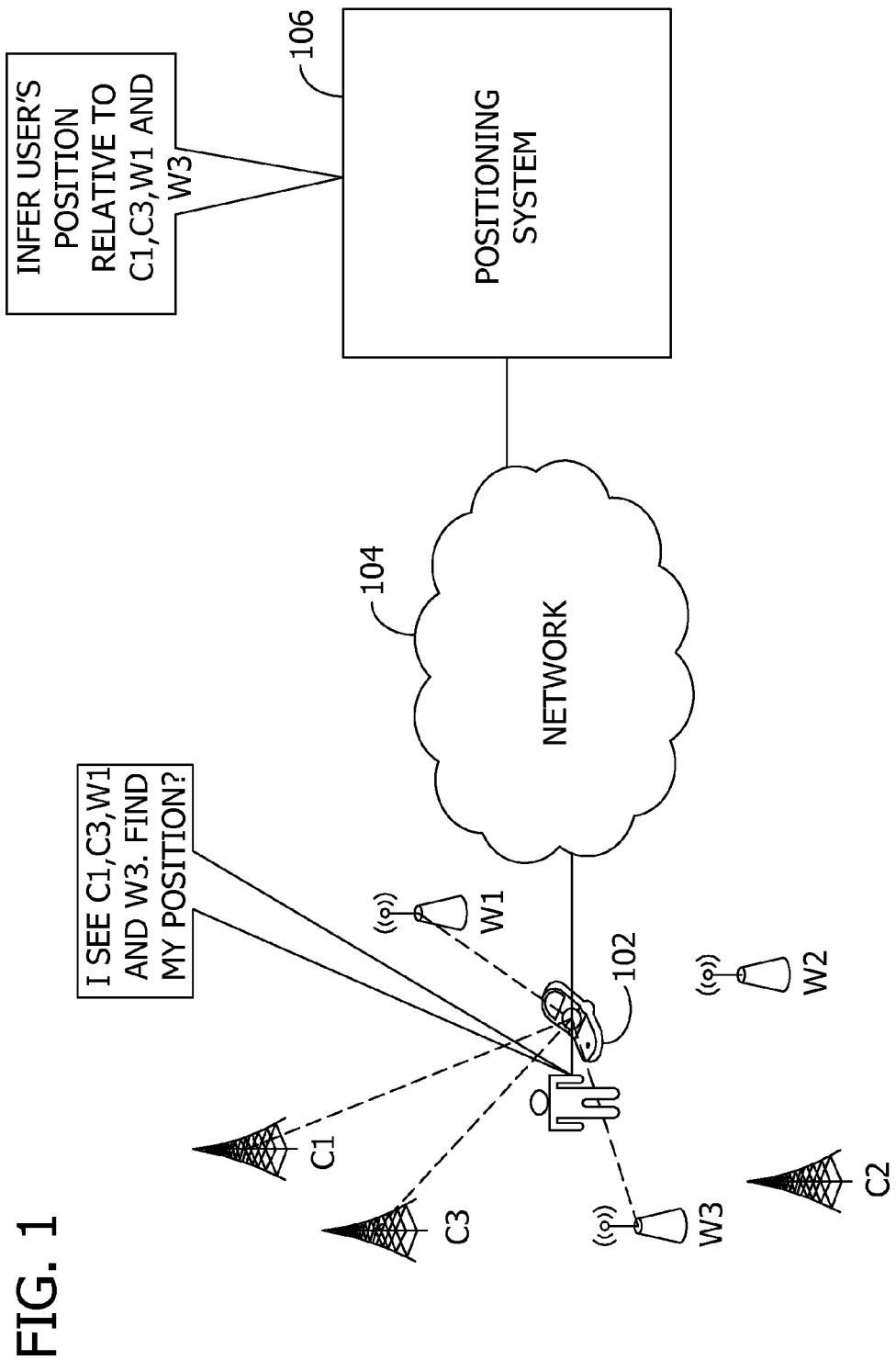
FIG. 1 is an exemplary block diagram illustrating a positioning system inferring a location of a mobile device based on a beacon fingerprint provided by the mobile device.

The beacons detected by the mobile device 102 at a given point in time represent the beacon fingerprint. The beacon fingerprint may also include other attributes of the detection such as signal strength. While aspects of the disclosure may be described with reference to beacons implementing protocols such as the 802.11 family of protocols, embodiments of the disclosure are operable with any beacon for wireless communication. In the example of FIG. 1, the mobile device 102 detects the presence of beacons C1, C3, W1, and W3.

The mobile device 102 provides the detected beacon fingerprint to the positioning system 106 via a network 104. The network 104 includes a wireless cellular network in some embodiments, but other types of networks such as Wi-Fi and those providing Internet access are contemplated in other embodiments.

The positioning system 106 stores, or has access to, data describing the approximate location of one or more of the beacons. The data is referred to as beacon reference data 314 and describes, for example, the longitude, latitude, and/or altitude of the beacons. In some embodiments, the beacon reference data 314 is stored in a beacon store 212. Using the approximate location of at least one of the beacons in the detected beacon fingerprint, the positioning system 106 operates to infer the location of the mobile device 102 relative to the detected beacon fingerprint, as described herein. The inferred location is provided to the mobile device 102.

Figure 2:
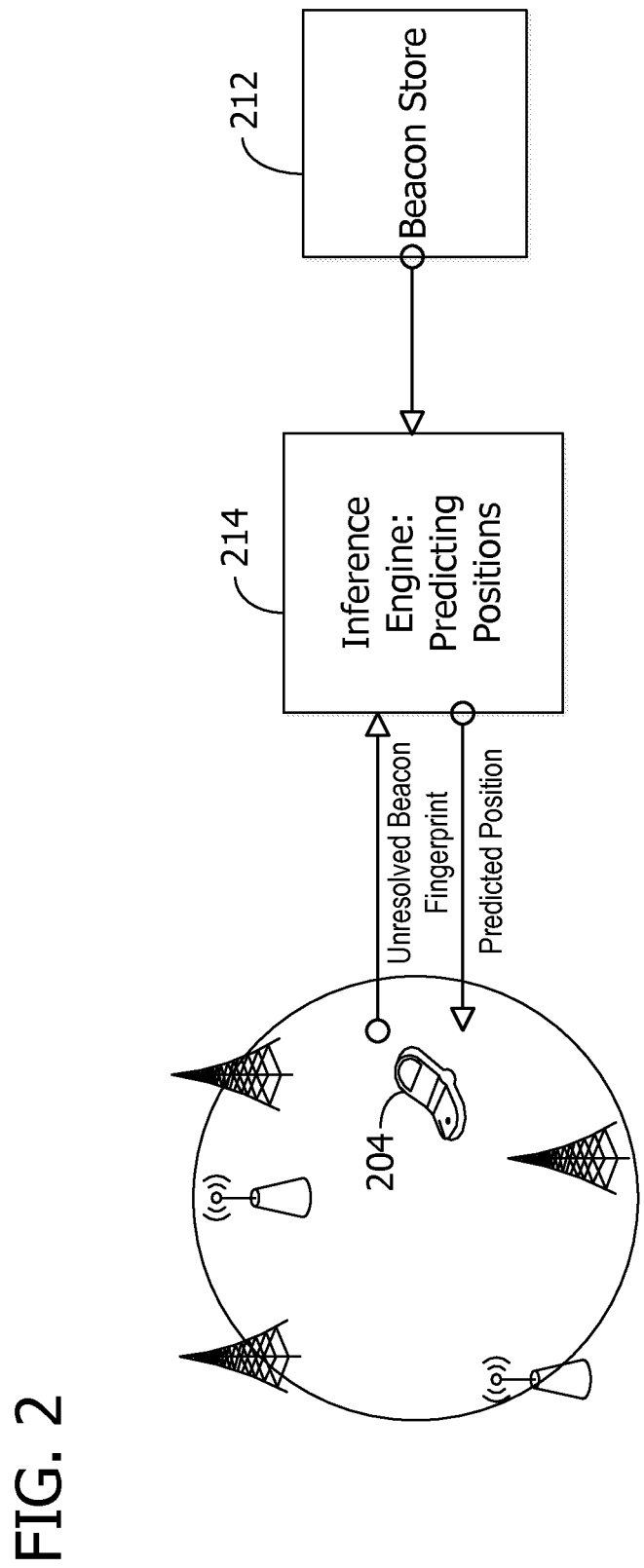
FIG. 2 is an exemplary block diagram illustrating receipt of a beacon fingerprint from a mobile computing device and calculation of a location for the mobile computing device based on the beacon fingerprint.

Referring next to FIG. 2, an exemplary block diagram illustrates receipt of a beacon fingerprint from a mobile computing device and calculation of a location for the mobile computing device based on the beacon fingerprint. The system illustrated in FIG. 2 represents an example of a location inference system or positioning system in accordance with aspects of the disclosure. However, other systems, elements, and configurations are contemplated and within the scope of embodiments of the disclosure.

The inference engine 214 receives a beacon fingerprint from devices such as the mobile device 204. The inference engine 214 accesses the beacon reference data 314 stored in the beacon store and predicts the location of observation associated with the unresolved beacon fingerprint. The predicted location is provided to the mobile device 204. The operation of the inference engine 214 is next described with reference to FIG. 3.

Figure 3:
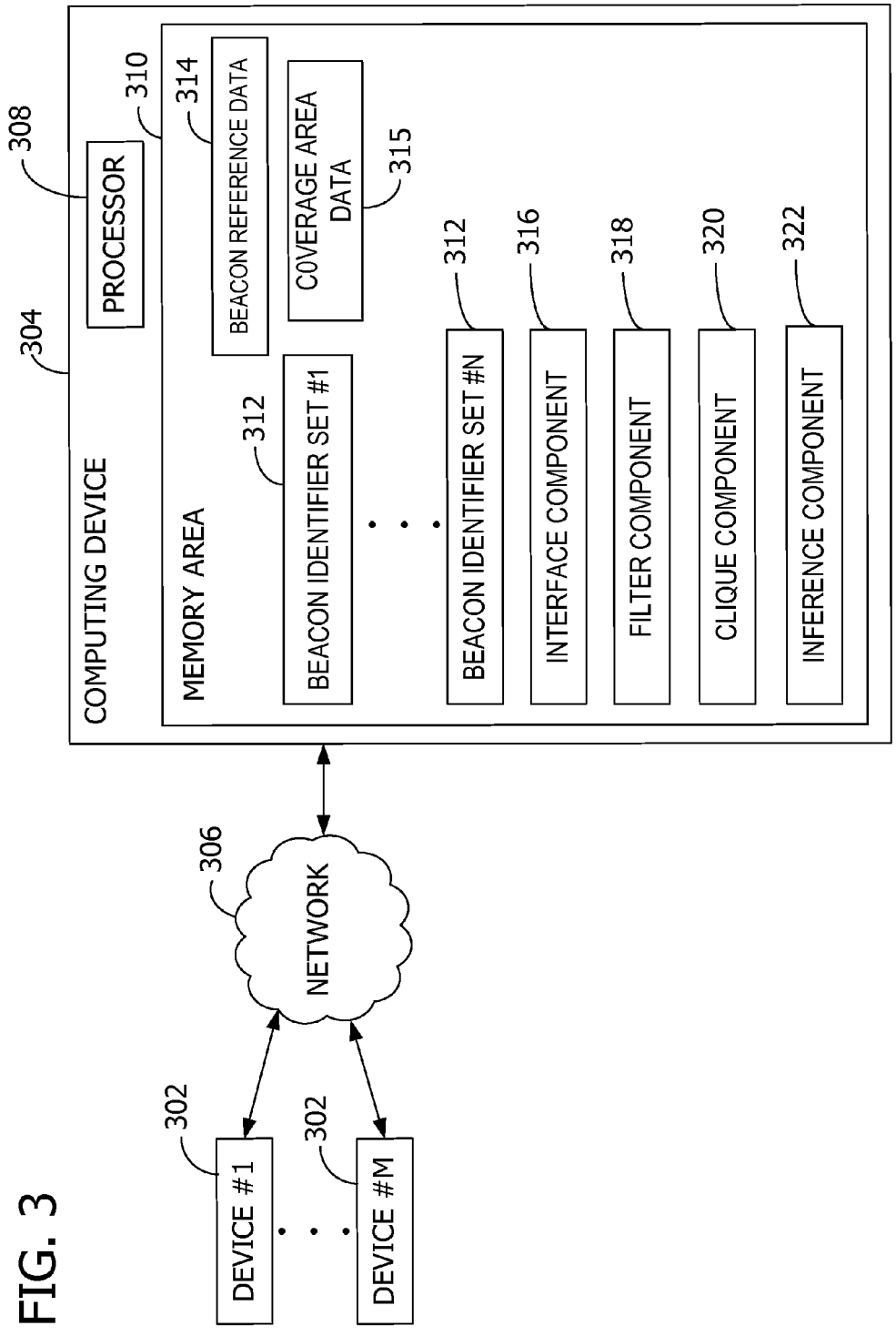
FIG. 3 is an exemplary block diagram illustrating a computing device selecting beacons from which to infer a location of another device.

Referring next to FIG. 3, exemplary block diagram illustrates a computing device 304 selecting beacons from a beacon fingerprint and calculating a location of another device based on the selected beacons. In some embodiments, the computing device 304 is associated with the positioning system 106. For example, the computing device 304 represents the inference engine 214.

The computing device 304 receives data from one or more of the devices 302, such as device #1 through device #M, via a network 306. The devices 302 include, for example, mobile computing devices such as mobile device 102. However, the devices 302 may include any device executing instructions (e.g., application programs) to provide data. The data includes beacon fingerprints.

In some embodiments, the devices 302 include portable computing devices such as laptops, netbooks, gaming devices, and/or portable media players. Further, each of the devices 302 may represent a group of processing units or other computing devices.

Exemplary networks 306 include wired and/or wireless networks, and may represent local area networks or global networks such as the Internet. In embodiments in which the network 306 includes wireless networks, the computing device 304 and the devices 302 may be enabled with technology such as BLUETOOTH brand wireless communication services (secured or unsecured), radio frequency identification (RFID), Wi-Fi such as peer-to-peer Wi-Fi, ZIGBEE brand wireless communication services, near field communication (NFC), and other technologies that enable short-range or long-range wireless communication.

The computing device 304 has at least one processor 308 and one or more computer-readable media such as a memory area 310. The processor 308 includes any quantity of processing units, and is programmed to execute computer-executable instructions for implementing aspects of the disclosure. The instructions may be performed by the processor 308 or by multiple processors executing within the computing device 304, or performed by a processor external to the computing device 304 (e.g., by a cloud service). In some embodiments, the processor 308 is programmed to execute instructions such as those illustrated in the figures (e.g., FIG. 4).

The memory area 310 includes any quantity of media associated with or accessible to the computing device 304. The memory area 310 may be internal to the computing device 304 (as shown in FIG. 3), external to the computing device 304 (not shown), or both (not shown).

The memory area 310 stores beacon identifier sets 312, such as beacon identifier set #1 through beacon identifier set #N. Each set 312 of beacon identifiers corresponds to a beacon fingerprint observed by one of the devices 302. Each of the beacon identifiers within each of the sets 312 corresponds to one of the observed beacons. For example, each Wi-Fi beacon has a Basic Service Set Identifier (BSSID). In another example, each Global Service for Mobile communications (GSM) cellular tower includes a mobile country code (MCC), mobile network code (MNC), location area code (LAC), and a cell identifier. Universal Mobile Telecommunication System (UMTS) towers have beacon identifiers composed of MCC, MNC, and a cell identifier. Carrier Division Multiple Access (CDMA) towers have beacon identifiers composed of a system identifier, network identifier, and a base-station identifier.

The memory area 310 further stores beacon reference data 314. The beacon reference data 314 for one of the beacons describes a position of the beacons. In some embodiments such as shown in FIG. 2, the beacon reference data 314 is stored on computer-readable media separate or remote from the computing device 304 (e.g., stored in the beacon store 212). For example, the beacon reference data 314 may be stored by a cloud computing service, and the computing device 304 accesses the beacon reference data 314 via a web service.

The memory area 310 further stores, or has access to, coverage area data 315. The coverage area data 315 includes coverage areas associated with the beacons represented by the beacon identifier set 312. Each of the beacons has a particular coverage area associated therewith. The coverage area may correspond to, for example, a circle or other shape. In some embodiments, the coverage area data 315 corresponds to signal strength. Further, in some embodiments, the coverage area data 315 may be part of the beacon reference data 314. The coverage area may be described by, for example, a radius or range of the beacons.

The memory area 310 further stores one or more computer-executable components for implementing aspects of the disclosure. Exemplary components include an interface component 316, filter component 318, clique component 320, and inference component 322. Operation of the components is discussed below with reference to FIG. 4.

At least a portion of the functionality of the various elements in FIG. 3 may be performed by other elements in FIG. 3, or an entity (e.g., processor, web service, server, application program, computing device, etc.) not shown in FIG. 3.

Figure 4:
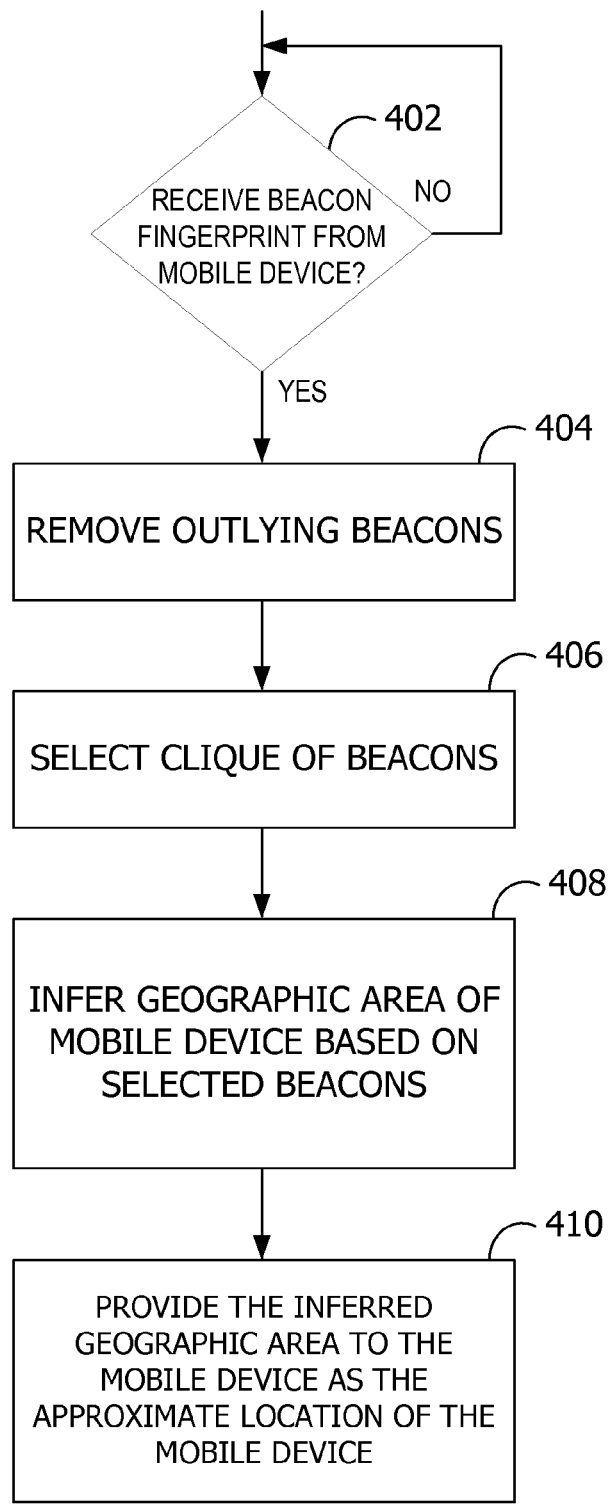
FIG. 4 is an exemplary flow chart illustrating location inference based on selected beacons.

Referring next to FIG. 4, an exemplary flow chart illustrates location inference based on beacons selected from a beacon fingerprint. The beacon fingerprint represents a set of beacons in a geographic area (e.g., a first geographic area) as observed by a device such as device 302 at a particular instant in time while the device 302 is at a particular geographic location (e.g., the point of observation). Upon receipt of the beacon fingerprint at 402 from device 302, a computing device such as computing device 304 analyzes the beacon fingerprint. For example, the computing device 304 may receive a request to calculate the point of observation, or location, of the beacon fingerprint. The computing device 304 may also receive, or already have access to, beacon reference data 314 and coverage area data 315 associated with the beacons in the beacon fingerprint.

At 404, one or more outlying beacons may be removed from the beacon fingerprint (e.g., from the beacon identifier set 312). The outlying beacons represent the beacons in the beacon fingerprint that are on the edge, boundary, or outskirts of the geographic area (e.g., the first geographic area) covered by the beacon fingerprint. The outlying beacons also represent the beacons that have moved, or are out of place. The outlying beacons are identified based on the beacon reference data 314 associated with the beacons. Alternatively, the beacons near the center of the geographic area are selected for further processing (thus excluding the outlying beacons).

At 406, a clique of beacons is selected from the beacons remaining after the operation at 404. The clique represents a subset of the beacons where each of the beacons in the subset has a coverage area that overlaps with the coverage area of each of the other beacons in the subset. In some embodiments, the subset of beacons is modeled or represented as an undirected graph with the beacons as nodes and where the beacons with overlapping coverage areas are connected by an edge between the respective nodes. In such embodiments, the clique is described as the subset of beacons where any two beacons in the subset are connected by an edge. Some embodiments determine the maximally complete clique of beacons. Alternatively, some embodiments may calculate the maximum complete clique of beacons. Determining the maximally complete clique is often less computationally intensive than determining the maximum complete clique. Further, adding another beacon to a maximally complete clique may not make the intersected area smaller to improve the accuracy of the location estimation. If there is more than one maximally complete clique, aspects of the disclosure select the clique with the most beacons to attempt to obtain a smaller intersected area.

At 408, a second geographic area is inferred or defined based on the clique of beacons, along with the beacon reference data 314 and coverage area associated with the clique of beacons. For example, a circle may be inferred. The second geographic area represents an area in which the computing device that provided the beacon fingerprint is located (e.g., the point of observation). By reducing the quantity of beacons from which to infer the second geographic area, the second geographic area as defined by the clique is smaller than the first geographic area.

At 410, the second geographic area is provided or identified to the computing device as an approximate location of the computing device. For example, the boundaries of the second geographic area are provided to the computing device. In another example, a center of the second geographic area is determined and provided to the computing device as the approximate location of the point of observation of the computing device.

In an example in which there are at least three beacons from which the second geographic area is determined, the second geographic area is determined by triangulation.

In some embodiments, the operations illustrated in FIG. 4 are performed by the computing device 304. In other embodiments, one or more of the operations illustrated in FIG. 4 are performed by another computing device (e.g., as a web service). In still other embodiments such as peer-to-peer embodiments, one or more of the operations illustrated in FIG. 4 are performed by the devices 302.

Further, the operations illustrated in FIG. 4 may be implemented as software instructions encoded on a computer-readable medium, in hardware programmed or designed to perform the operations, or both. As an example, the operations in FIG. 4 may be implemented as computer-executable components or other software such as in the components illustrated in FIG. 3. In such an example, the interface component 316, when executed by the processor 308, causes the processor 308 to receive data representing a set of beacons observed by a computing device. The beacons are located within a first geographic area. The filter component 318, when executed by the processor, causes the processor to select no more than a first predefined quantity of the beacons based on the coverage areas of the beacons. For example, the filter component 318 may select seven of the beacons having the smallest coverage areas. In some embodiments, a small coverage area for one of the beacons represents a high degree of accuracy or confidence in the beacon reference data 314 corresponding to the beacon.

The clique component 320, when executed by the processor, causes the processor to identify no more than a second predefined quantity of the selected beacons each having overlapping coverage areas (e.g., where each of the identified beacons has a coverage area that overlaps with the coverage areas of each of the other identified beacons). For example, the clique component 320 may select three of the beacons with overlapping coverage areas to enable triangulation. To reduce the computation complexity, some embodiments stop searching for additional or larger cliques once a clique of three beacons has been found.

The inference component 322, when executed by the processor, causes the processor to define the second geographic area based on the beacons identified by the clique component 320, and based on the beacon reference data 314 and coverage area data 315.

Figure 5:
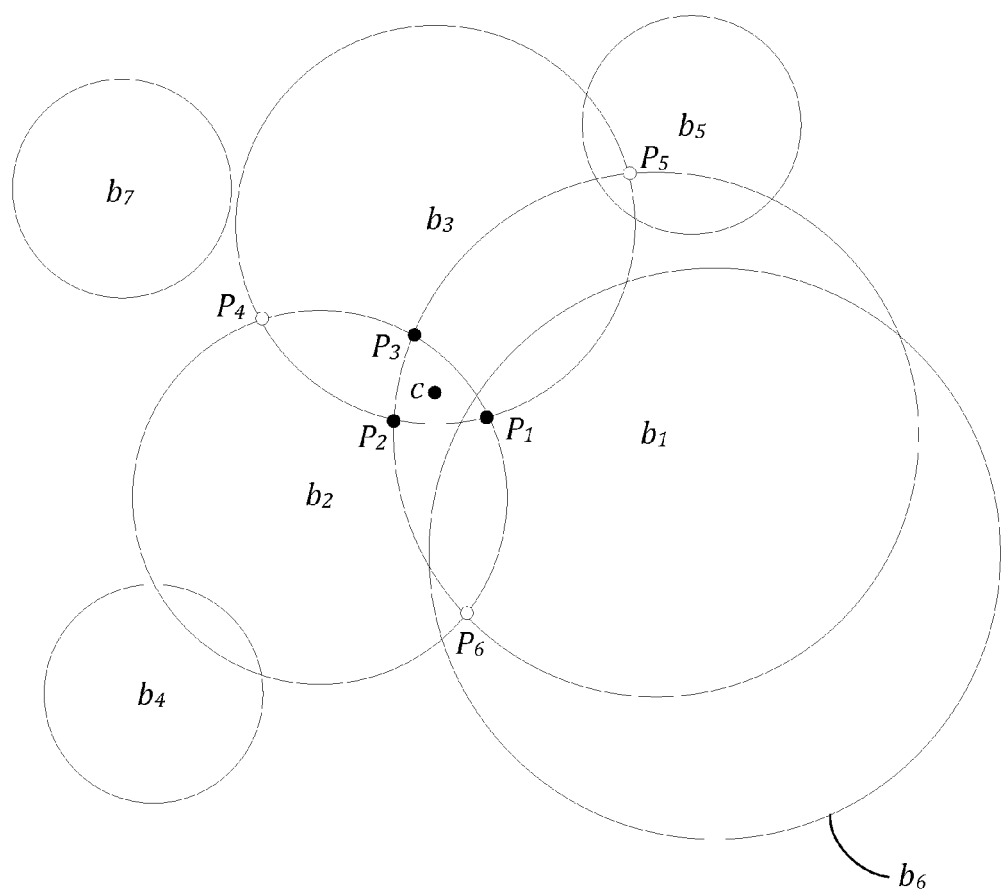
FIG. 5 is an exemplary block diagram illustrating a beacon fingerprint having a maximally complete clique.

Referring next to FIG. 5, an exemplary block diagram illustrates a beacon fingerprint having a maximally complete set of beacons. In the example of FIG. 5, a device such as device 302 has observed beacons $b_1$, $b_2$, $b_3$, $b_4$, $b_5$, $b_6$, and $b_7$ that constitute the beacon fingerprint. The circles around each of the beacons represent the coverage areas associated with the beacons.

There are two cliques in FIG. 5, one is maximum and the other is maximal. The maximum clique includes beacons $b_1$, $b_2$, $b_3$, and $b_6$, while the maximal clique includes beacons $b_1$, $b_2$, and $b_3$.

An example for selecting beacons for determining a location of the device 302 is next described with reference to FIG. 5.

An exemplary algorithm, flow, or pseudo code for implementing aspects of the disclosure as computer-executable instructions is next described. In the example algorithm below, the input is a beacon fingerprint $\{b_1, b_2, \ldots, b_N\}$. The output is a circle C centered at c with radius $R_c$. An exemplary pre-condition of the algorithm is that for each i, if $b_i$ is detected at y, then y is within $C_i$ with 95% probability. As a result, the true position x of the device is in C with 95% probability.

---

1. Eliminate beacon outliers, based on the typical coverage area of beacon
    1.1. Find the median $m_1$ of $\{b_1, b_2, \ldots, b_N\}$
    1.2. Filter by tile membership
        1.2.1. Remove beacons not in the tile for $m_1$ nor in its neighboring tiles, if applicable
    1.3. Filter by distance to the median
        1.3.1. Remove $b_j$ such that $\text{Dist}(b_j, m_1) > \text{max\_beacon\_distance}$ (e.g. 500 meters for Wi-Fi beacon, 20 kilometers for cellular beacon
2. Select beacons for inference, using 95% confidence circles
    2.1. $\{b_1, b_2, \ldots, b_K\}$ are the beacons remaining from operation 1 above sorted by radius in non-decreasing order ($r_i \leq r_j$ for all $i < j$)
    2.2. If K = 0 return "Location not found" (beacons are too dispersed)
    2.3. If K = 1, set C to $C_1$ (e.g., $c = b_1$, $R_c = r_1$)
    2.4. If K is greater than 1 (e.g., at least two beacons)
        2.4.1. Model the beacon set as an undirected graph, where each node is a beacon and two nodes are connected if their circles intersect.
        2.4.2. Find all maximally complete components or cliques (e.g., maximally complete subgraphs in which all pairs of nodes are directly connected). The circles in a complete component intersect on at least one point.
            2.4.2.1. Initialize $G = \{G_1 = G(b_1) = \{\{b_1\}\}\}$; $S = \{b_2, \ldots, b_K\}$
            2.4.2.2. For each $b_i$ in S, check component $G_t$ in G, from lower indexed to higher indexed, if $\{b_i\} \cup G_t$ is still a complete component
                2.4.2.2.1. If so, add $b_i$ to first $G_t(\{b_i\} \cup G_t$ is a complete component
                2.4.2.2.2. If no component $G_t$ exists in G such that $\{C_i\} \cup G_t$ is a complete component, then start a new component $G_j = G(b_i) = \{b_i\}$ and append it to G -continued 2.4.3. If there is more than one complete component in G, select the component with the maximum number of nodes; select the smallest indexed component if there is a tie in the number of nodes
3. Infer the circle, using the complete component selected in operation 1 above
  3.1. $\{b_1, b_2, ..., b_L\}$ are the L beacons in the selected complete component from operation 1 above and assume the beacons are sorted by radius in non-decreasing order ($r_i \leq r_j$ for all i <j)
  3.2. If L is 1 (e.g., only one beacon), set C to $C_1$ (e.g., c = $b_1$, $R_c = r_1$)
  3.3. If L is 2 (e.g., only two beacons), set C = Jointcircle($C_1$, $C_2$)
    3.3.1. If Dist($b_1$, $b_2$) $\leq$ Sqrt($r_2^2 - r_1^2$) set C = $C_1$
    3.3.2. else
      3.3.2.1. Find the two intersetion points $P_1$ and $P_2$
      3.3.2.2. Set c to the intersetion point of Line($P_1$, $P_2$) and Line($b_1$, $b_2$)
      3.3.2.3. Set $R_c$ to Max(Dist(c, $P_1$), 50 meters)
  3.4. If L $\geq$ 3 (e.g., there are more than two beacons)
    3.4.1. Select the first 3 beacons with the smallest radius or strongest signal strength
      3.4.1.1. Check $C_1$, $C_2$, $C_3$ for pair-wise inclusion; if found, remove the containing circle and go to operation 3.3 with the remaining two circles; otherwise continue
      3.4.1.2. Check if ($C_1 \cap C_2 \subset C_3$) or ($C_1 \cap C_3 \subset C_2$) or ($C_2 \cap C_3 \subset C_1$), if so, remove the containing circle and go to 3.3 with the remaining two circles; else continue
      3.4.1.3. If($C_1 \subset C_2 \cup C_3$), set C to $C_1$; otherwise continue
      3.4.1.4. Find the three intersection points $P_1$, $P_2$, $P_3$
      3.4.1.5. Set c to the center of circumcircle (e.g., c is equidistant to $P_1$, $P_2$, $P_3$)
      3.4.1.6. Set $R_c$ to Max(Dist(c, $P_1$), 50 meters)

In the above example, the minimum radius is set to 50 meters to reflect a typical radius since it is possible that the calculated R value could be less than 50.

Additional Examples

Another exemplary algorithm, flow, or pseudo code for implementing aspects of the disclosure as computer-executable instructions is next described. In this example, the quantity of beacons analyzed is limited to seven to reflect one serving cell and six neighboring cells. Further, the maximum clique size is limited to three to enable triangulation yet avoid unnecessary computation. In the example algorithm below, the input is a beacon fingerprint $\{b_1, b_2, \ldots, b_N\}$. The output is a circle C centered at c with radius $R_c$. An exemplary pre-condition of the algorithm is that for each i, if $b_i$ is detected at y, then y is within $C_i$ with 95% probability. As a result, the true position x of the device is in C with 95% probability.

1. Eliminate beacon outliers, based on the typical coverage area of beacon
  1.1. Find the median $m_1$ of $\{b_1, b_2, ..., b_N\}$
  1.2. Filter by tile membership
    1.2.1. Remove beacons not in the tile for $m_1$ nor in its neighboring tiles, if applicable
  1.3. Filter by distance to the median
    1.3.1. Remove $b_i$ such that Dist($b_i$, $m_1$) > max_beacon_distance (e.g. 500 meters for Wi-Fi beacon, 20 kilometers for cellular beacon)
2. Select beacons for inference
  2.1. $\{b_1, b_2, ..., b_K\}$ are the beacons remaining from operation 1 sorted by radius in non-decreasing order ($r_i \leq r_j$ for all i <j)
    2.1.1. If K > 7, set K = 7 (e.g., truncate to the first 7 beacons)
  2.2. If K = 0 return "Location not found" (e.g., beacons are too dispersed)
  2.3. If K = 1, set C to $C_1$ (e.g., c = $b_1$, Rc = $r_1$)
  2.4. If 2 $\leq$ K $\leq$ 7
    2.4.1. Model the beacon set as an undirected graph, where each node is a beacon and two nodes are connected if their circles intersect.
    2.4.2. For all 3-tuples $\{b_i, b_j, b_k\}$, i < j < k
      2.4.2.1. If $\{b_i, b_j, b_k\}$ is a complete subgraph (or 3-clique), go to operation 3 with $\{b_i, b_j, b_k\}$; otherwise continue
    2.4.3. If no 3-clique found, for all pair $\{b_i, b_j\}$, i <j
      2.4.3.1. If $\{b_i, b_j\}$ is a complete subgraph (or 2-clique), go to operation 3 with $\{b_i, b_j\}$; otherwise continue
    2.4.4. If no 2-clique or 3-clique found, go to operation 3 with $\{b_1\}$ -continued 3. Infer the circle, using the beacons selected from operation 2 (at most 3 beacons selected)
   3.1. $\{b_1, ..., b_L\}$ are the L beacons selected and sorted by radius in non-decreasing order ($r_i \leq r_j$ for all i <j)
   3.2. If L = 1, set C to $C_1$ (e.g., c = $b_1$, $R_c$ = $r_1$)
   3.3. If L = 2, then C = JointCircle($C_1, C_2$)
      3.3.1. If Dist($b_1, b_2$) ≤ Sqrt($r_2^2 - r_1^2$) set C = $C_1$
      3.3.2. else
         3.3.2.1. Find the two intersection points $P_1$ and $P_2$.
         3.3.2.2. Set c to the intersection point of Line($P_1, P_2$) and Line($b_1, b_2$)
         3.3.2.3. Set $R_c$ to Max(Dist(c, $P_1$), 50 meters)
   3.4. If L = 3
         3.4.1.1. Check $C_1, C_2, C_3$ for pair-wise inclusion; if found, remove the containing circle and go to operation 3.3 with the remaining two circles; otherwise continue
         3.4.1.2. Check if ($C_1 \cap C_2 \subset C_3$) or ($C_1 \cap C_3 \subset C_2$) or ($C_2 \cap C_3 \subset C_1$), if so, remove the containing circle and go to 3.3 with the remaining two circles; else continue
         3.4.1.3. Check if ($C_1 \subset C_2 \cup C_3$), if so set C to $C_1$; otherwise continue
         3.4.1.4. Find the three intersection points $P_1, P_2, P_3$
         3.4.1.5. Set c to the center of circumcircle (equal-distance point to $P_1, P_2, P_3$)
         3.4.1.6. Set $R_c$ to Max(Dist(c, $P_1$), 50 meters)

In the above example, the minimum radius is set to 50 meters to reflect a typical radius since it is possible that the calculated R value could be less than 50.

In some embodiments, the operations illustrated in FIG. 4 executed on a mobile device enabled with BLUETOOTH brand communication technology. Application programs such as gaming application programs executing on the mobile device may use the calculated position information to adjust their operation. In this manner, the mobile device acts as a gaming controller (e.g., joystick).

While embodiments have been described with reference to data collected from users, aspects of the disclosure provide notice to the users of the collection of data (e.g., via a dialog box or preference setting) and the opportunity to give or deny consent. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for selecting beacons from which to infer positional data for a computing device, and exemplary means for filtering beacon identifiers representing outlying beacons from the set of beacon identifiers.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for selecting beacons from which to infer a location of a mobile computing device, said system comprising:
   a memory area for storing a set of beacon identifiers, said beacon identifiers corresponding to beacons observed by a mobile computing device, said beacons being located within a first geographic area as observed by the mobile computing device, said memory area further storing beacon reference data and a confidence circle associated with each of the beacon identifiers, the confidence circle representing a degree of confidence in the beacon reference data corresponding to the beacon; and
   a processor programmed to:
      receive the set of beacon identifiers from the mobile computing device;
      identify, based on the beacon reference data stored in the memory area, one or more of the beacon identifiers corresponding to outlying beacons located on an edge of the first geographic area, the outlying beacons being identified based on the beacon reference data associated with the beacons;
      remove the identified beacon identifiers from the set of beacon identifiers stored in the memory area;
      select, from the set of beacon identifiers and based on the confidence circles associated therewith stored in the memory area, a subset of beacon identifiers corresponding to beacons whose confidence circles each overlap with each other; and
      determine a second geographic area based on the selected beacon identifiers and the beacon reference data and the confidence circles associated therewith, said mobile computing device being within the second geographic area, wherein the second geographic area is smaller than the first geographic area.

2. The system of claim 1, wherein each confidence circle stored in the memory area corresponds to a radius of a circle associated with at least one of the beacon identifiers.

3. The system of claim 2, wherein the circle represents an inferred location of the mobile computing device with the degree of confidence.

4. The system of claim 1, wherein the processor is programmed to determine the second geographic area by triangulation when the second geographic area is determined from at least three beacons.

5. The system of claim 1, wherein the processor is programmed to select the subset of beacon identifiers by determining a maximum complete clique of the beacon identifiers.

6. The system of claim 1, wherein the processor is programmed to provide the determined second geographic area to the mobile computing device.

7. The system of claim 1, wherein the processor is programmed to determine the second geographic area by inferring a smallest circle based on the selected subset of beacon identifiers and the beacon reference data and the confidence circles associated therewith, the smallest circle being inferred from the overlapping confidence circles of the beacons.

8. A method comprising:
   receiving data representing a set of beacons from a computing device, said beacons being observed by the computing device, said beacons being located within a first geographic area as observed by the computing device;
   selecting a subset of the beacons based on confidence circles of each of the beacons, wherein the confidence circles of each of the beacons in the selected subset overlap with each other, the confidence circles representing a degree of confidence in beacon reference data corresponding to the respective beacon;
   accessing the beacon reference data associated with each of the beacons; and
   defining a second geographic area based on the selected subset of beacons and the beacon reference data and the confidence circles associated therewith, said computing device being within the second geographic area, wherein the second geographic area is smaller than the first geographic area.

9. The method of claim 8, further comprising providing the defined geographic area to the computing device as an approximate location of the computing device.

10. The method of claim 8, further comprising:
    identifying, based on the accessed beacon reference data, one or more beacons from the set of beacons corresponding to outlying beacons located on an edge of the first geographic area, the outlying beacons being identified based on the beacon reference data associated with the beacons; and
    removing the identified beacons from the set of beacons.

11. The method of claim 8, further comprising identifying, from the set of beacons based on the beacon reference data, one or more beacons corresponding to beacons located near a center of the first geographic area, and wherein selecting the subset of the beacons comprises selecting a subset of the identified beacons.

12. The method of claim 8, wherein selecting the subset of the beacons comprises determining a maximally complete set of the beacon identifiers, the maximally complete set of the beacon identifiers representing a clique with the most beacons relative to other cliques of beacons.

13. The method of claim 8, wherein selecting the subset of the beacons comprises determining a clique of the beacon identifiers.

14. The method of claim 8, further comprising storing the defined second geographic area as a location of the computing device.

15. The method of claim 8, wherein defining the second geographic area comprises inferring a smallest circle based on the selected subset of beacons and the beacon reference data and the confidence circles associated therewith, the smallest circle being inferred from the overlapping confidence circles of the selected subset of beacons.

16. One or more computer storage media storing computer-executable components, said components comprising:
    an interface component that when executed by at least one processor causes the at least one processor to receive data representing a set of beacons, said beacons being observed by a computing device, said beacons being located within a first geographic area as observed by the computing device, said beacons having beacon reference data associated therewith describing a location of the beacons;

a filter component that when executed by at least one processor causes the at least one processor to select no more than a first predefined quantity of the beacons based on a confidence circle of each of the beacons, the confidence circle representing a degree of confidence with which the computing device is located in the confidence circle;

a clique component that when executed by at least one processor causes the at least one processor to identify no more than a second predefined quantity of the selected beacons whose confidence circles each overlap with each other; and an inference component that when executed by at least one processor causes the at least one processor to define a second geographic area based on the identified beacons and the beacon reference data and the confidence circles associated therewith, said computing device being within the defined second geographic area, and wherein the second geographic area is smaller than the first geographic area.

17. The computer storage media of claim 16, wherein the first predefined quantity is seven and the second predefined quantity is three.

18. The computer storage media of claim 16, wherein the clique component determines a maximally complete set of the selected beacons.

19. The system of claim 1, wherein the processor is programmed to determine a center of the second geographic area and provide to the mobile computing device as an approximate location of the mobile computing device.

20. The computer storage media of claim 16, wherein the filter component selects the first predefined quantity of the beacons having the smallest confidence circles.

* * * * *